United States Patent [19]

Trentini et al.

[11] 4,107,690

[45] Aug. 15, 1978

[54] ANTENNA ARRANGEMENT FOR RADAR OR DIRECTION FINDING PURPOSES RESPECTIVELY, WITH SUM AND DIFFERENCE PATTERNS

[75] Inventors: Giswalt V. Trentini, Munich; Werner Jatsch, Neubiberg, both of Germany

[73] Assignee: Siemens Aktiengesellschaft, Berlin & Munich, Germany

[21] Appl. No.: 385,589

[22] Filed: Jul. 26, 1973

[30] Foreign Application Priority Data

Sep. 15, 1972 [DE] Fed. Rep. of Germany ....... 2245346

[51] Int. Cl.[2] ............................................... G01S 3/46

[52] U.S. Cl. ............................. 343/113 R; 343/16 M; 343/779

[58] Field of Search .................... 343/779, 835, 16 M, 343/912, 916, 113 R, 853

[56] References Cited

U.S. PATENT DOCUMENTS

| | | | |
|---|---|---|---|
| 2,929,059 | 3/1960 | Parker | 343/16 M |
| 3,078,453 | 2/1963 | McGillem et al. | 343/16 M |
| 3,182,322 | 5/1965 | Nankervis | 343/779 |

*Primary Examiner*—Maynard R. Wilbur
*Assistant Examiner*—Richard E. Berger
*Attorney, Agent, or Firm*—Hill, Gross, Simpson, Van Santen, Steadman, Chiara & Simpson

[57] ABSTRACT

The antenna arrangement for radar or direction finding purposes, respectively, has sum and difference patterns for mono-pulse operation comprising a reflector and at least two linearly polarized exciters located approximately in the center between which perpendicular to their polarization direction a metallic conductive plane partition is disposed which extends to the reflector and stands perpendicularly thereon, wherein the partition does not extend through the entire reflector from edge to edge but is arranged only approximately in the area of the exciters.

9 Claims, 4 Drawing Figures

ANTENNA ARRANGEMENT FOR RADAR OR DIRECTION FINDING PURPOSES RESPECTIVELY, WITH SUM AND DIFFERENCE PATTERNS

BACKGROUND OF THE INVENTION

1. Field of the Invention

This invention relates to an antenna arrangement for radar, or for direction finding purposes, respectively, with sum and difference patterns for monopulse operation, and more particularly to such an arrangement comprising a reflector and at least two linear polarized exciters which are located approximately in the center between which perpendicular to their polarization direction a metallic conductive plane dividing wall is arranged reaching up to the reflector and extending perpendicularly thereto.

2. Description of the Prior Art

An antenna arrangement consisting of two reflector halves each having an exciter is known from the British Pat. No. 1,105,503. The two reflector halves are separated by an interim piece of approximately $\frac{3}{8}\lambda$ so that two clearly separated focal points will result whereat the exciters are located. A dividing wall is arranged between the exciters for decoupling of the two antenna halves. Therefore, two symmetrical and evenly constructed antenna halves are created, whereby one is merely used for transmitting and the other one exclusively for receiving. An interacting of both antenna halves, such as for example takes place in monopulse direction finding with sum and difference patterns is thus excluded.

The German Offenlegungsschrift No. 1,953,743 discloses an antenna arrangement for radar or direction finding purposes, respectively, for monopulse operation comprising a reflector and linearly polarized exciters which are arranged symmetrically with respect to the focal point, between which a continuous plane dividing wall extending to the reflector is interposed perpendicularly to the direction of polarization. Thus, two completely separated and decoupled antenna halves are created of which each, for example, is excited by a horn radiator with mirror image. In sum, as well as in difference operation, therefore the primary diagram and thus the illumination of both reflector halves remains unchanged. The radiation characteristics obtained are very favorable. Only in case of radar-equipments, the angular range, which can be jammed by electronic countermeasures, is in the difference channel,relatively large.

SUMMARY OF THE INVENTION

The present invention is based on the task of improving such an antenna arrangement in such a way that the angle range which can be disturbed by electronic countermeasures is decreased and the mechanical structure simplified.

According to the invention, which refers to an antenna arrangement of the above-mentioned kind, this task is solved in that the partition does not extend through the entire reflector from edge to edge, but is arranged only approximately in the area of the exciters. The radiation is, in that case, completely reflected only in direct proximity of the exciters. Outside of this central partition an overradiation to the other half is permitted. In case of sum operation, the illumination remains largely unchanged. In case of difference operation, the aperture illumination is changed by the counter-phased parts. The maxima of radiation are more diverging and the outer slope of the differential diagram is steeper than with an arrangement having an enlarged partition.

Also the production and the mounting of the comparatively small partition have proven advantageous. The weight and the resulting rotary moment, as well as the wind pressure, are diminished. In addition, a mechanical oscillation of the exciter system with the partition opposite the reflector can be carried out in a simpler manner.

The impedance of the exciters remains unchanged for both operational conditions, so that, for example, a very good adaptation to a comparator connected to the antenna can be achieved. The antenna arrangement is very safe to operate and largely frequency independent.

Preferably, the reflector comprises two symmetrical halves which are joined together along the joined piece of the partition and its straight extension. The two reflector halves are preferably not separated too far for the installation of the small partition. In the case of two reflector halves wherein both focal points coincide with the position of the exciters and the mirror images, the distance should not substantially exceed half a wave length. The space which results between the two reflector halves should preferably be filled with a metal strip.

In a preferred embodiment of the invention on each side of the partition a single exciter is arranged so that in each antenna half an exciter with mirror image exists.

The reflector is designed, as far as its form, depending on which radiation diagram is to be achieved. If, for example, a pencil beam is to be radiated, a rotation paraboloid is preferably employed. For achieving, for example, a fan beam, preferably a paraboloid section is used, and for the creation of a $\mathrm{cosec}^2$ diagram a double-curved reflector is used.

The exciters can be designed as horn radiators or as monopoles which are arranged perpendicularly to the partition depending on the structure of the respective reflector and the range of the wave length. The use of monopoles as exciters provides the advantage that in addition reflector rods which are conductively connected with the partition may be arranged behind the same.

In a case of center feeding of the exciters, which means starting from the vertex of the parabolic reflector with, for example, four waveguides for the sum and difference formation in the elevation and azimuth plane, they should preferably have only a very low height. The partition can then be separated and be arranged in a plane at both sides of the waveguide package which comprises these four flat waveguides.

For center feeding by horn radiators via waveguides coming from the vertex of the parabola and being diverted, phase errors by reflection at the waveguides can be avoided in that the partition comprises two parallel partitions which lie at the edge of the waveguides, which should preferably be designed as flat waveguides.

BRIEF DESCRIPTION OF THE DRAWING

Other objects, features and advantages of the invention, its organization, construction and operation will be best understood from the following detailed description of a preferred embodiment of the invention taken in conjunction with the accompanying drawing, on which.

DESCRIPTION OF THE PREFERRED EMBODIMENT

Figure 1:
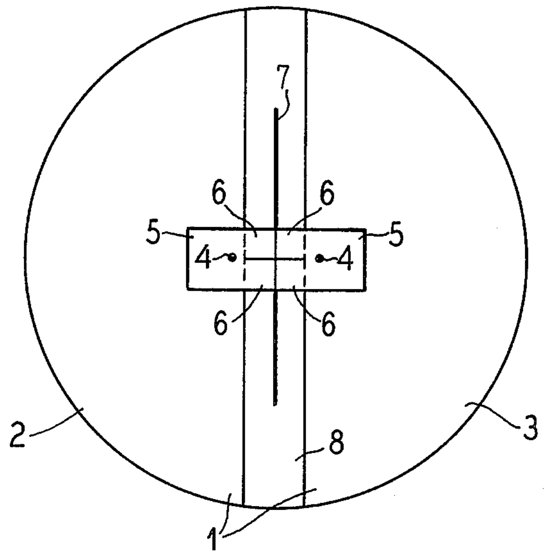
FIG. 1 is a front view of an antenna which creates an almost rotary-symmetrical beam and which comprises a rotation paraboloid as a reflector and two linearly polarized horn radiators.
Figure 2:
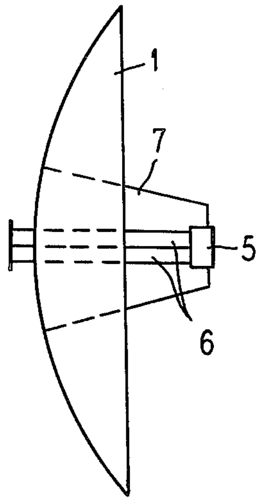
FIG. 2 is a side view of the apparatus illustrated in FIG. 1.

Referring to FIGS. 1 and 2, an antenna which creates an almost rotary-symmetrical beam comprises a rotation paraboloid as a reflector 1 and two linearly polarized horn radiators 5. A metallic conductive plane partition 7 is arranged perpendicular to the reflector 1 and perpendicular to the polarization direction of the horn radiators 5. The reflector 1 is composed of two parts disposed on both sides of the horn radiators 5 which serve as exciters. The sum and difference operation is carried out by means of waveguide hybrids (comparator) at which the two horn radiators 5 are connected by way of four flat waveguides 6. The waveguides 6 are combined into a package and extend through an opening in the vertex of the reflector. The reflector 1, as mentioned above, comprises two halves 2 and 3 which are connected by a metal strip 8. The comparatively small partition 7 which extends only approximately across the area of the horn radiators and the flat feed waveguides 6 is provided with a surface having good conductivity.

Figure 1A:
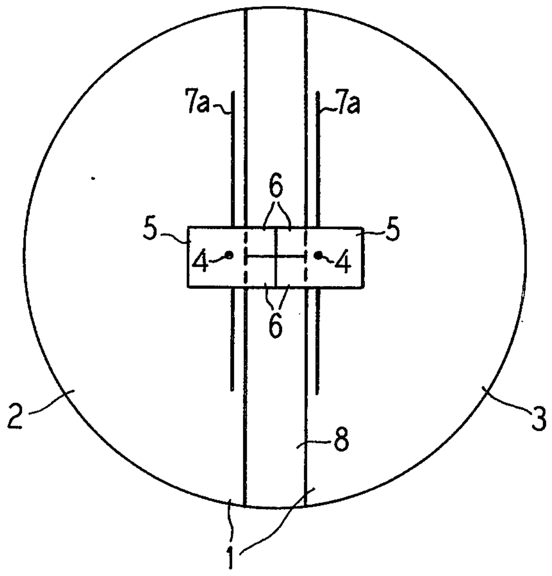
FIG. 1*a* is a front view of an antenna similar to that illustrated in FIG. 1, but comprising a pair of parallel partitions in the area of the radiators.

In the structure with respect to the azimuth plane, therefore, a separation into two reflector halves exists which are slightly separated by the metal strip. The distance of the reflector halves 2 and 3 is filled with the metal strips 8 and should not substantially exceed half a wave length. The focal points 4 coincide with the exciters and the mirror images. The coincidence of the focal points 4 with the phase centers of the exciters and their mirror images applies strictly only for the case of two parallel partitions 7*a*. However, the phase errors remain low even if one partition 7 is used. The case of the two parallel partitions 7*a* is illustrated in FIG. 1*a* by means of a dotted line. The two partitions 7a are located at the edge of the waveguide package consisting of the waveguides 6. Compared with the use of one partition 7, the reflections at the waveguide gradation creating the phase errors do not occur.

Figure 3:
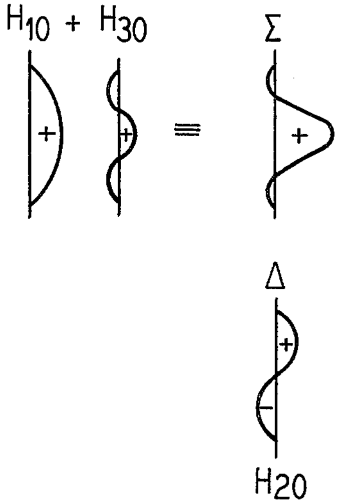
FIG. 3 is a graphic illustration of wave modes occurring in the horn radiator with respect to field strength distribution across the width of the waveguide.

At this point, the principal structure with respect to the elevation plane should be briefly noted. A horn radiator is located in each antenna half such that in case of sum operation the $H_{10}$ and $H_{30}$ wave-modes are excited in phase, and in the case of difference operation, the $H_{20}$ wave-mode is excited. These wave-modes occurring in the horn radiator 5 are illustrated in detail with respect to their field strength distribution across the waveguide width. For example, see FIG. 3. Thereby, in both cases, a favorable reflector illumination is achieved. However, in case of sum operation a certain frequency dependence due to the drift space length in the wide waveguide will exist. The transition from two waveguides 6 to a wide waveguide has to be suitably dimensioned. It may be necessary to utilize dielectric inserts. Preferably, a slight beam deflection is provided in the azimuth plane by tilting the reflector 1 with respect to the exciters 5 for a better target acquisition. Therefore, a large partition would be unsuitable.

The radiation is only completely reflected in the immediate area of the horn radiators 5. Outside of this central partition 7, therefore, spillover to the other half exists. In case of sum operation, the illumination remains substantially unchanged with respect to an arrangement with an enlarged partition and also with respect to an arrangement without a partition. In the case of difference operation, however, the aperture illumination changes due to the coupling of the antiphase parts. The radiation maxima are diverging and the outer slope of the difference pattern radiated from the reflector antenna becomes more steep than in the arrangement comprising the enlarged partition.

If necessary, for a better target acquisition, the beam in the azimuth plane has to be somewhat broadened. In such a case, the illumination to the reflector edge decreases substantially. By means of an additional defocusing with a reduced distance of the reflector halves 2 and 3 with respect to each other, the beam width can be further broadened. Subsequently the antenna gain will be somewhat reduced and the minor lobes increase.

Although we have described our invention by reference to a particular illustrative embodiment thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. An antenna arrangement for radar or direction finding purposes having sum-difference patterns for monopulse operation, comprising: a reflector; two linearly polarized exciters located approximately centrally of and spaced from said reflector; a metallic conductive planar partition disposed between said two exciters and extending to said reflector, said partition disposed perpendicular to said reflector, said partition extending over only a portion of said reflector approximately in the area of said exciters; and a comparator connected to said exciters for a sum-difference operation so that the exciter located on one side of said partition can be compared with the exciter located on the other side of said partition with respect to voltage.

2. An antenna arrangement according to claim 1, wherein said reflector comprises two symmetrical halves joined together along a portion of said partition.

3. An antenna arrangement according to claim 1, wherein said reflector comprises two symmetrical reflector halves which are slightly spaced apart, and a strip joining said halves.

4. An antenna arrangement according to claim 3, wherein said strip is a metal strip.

5. An antenna arrangement according to claim 1, wherein said reflector has the shape of a rotation paraboloid.

6. An antenna arrangement according to claim 1, wherein said reflector has the shape of a parabolic section.

7. An antenna arrangement according to claim 1, wherein said exciters are horn radiators.

8. An antenna arrangement for radar or direction finding purposes having sum-difference patterns for monopulse operation, comprising: a reflector; at least four linearly polarized exciters located approximately centrally of and spaced from said reflector; and a metallic conductive planar partition disposed between pairs of said exciters and extending to said reflector, said partition disposed perpendicular to said reflector, said partition extending over only a portion of said reflector approximately in the area of said exciters; and comprising a comparator connected to said exciters for a sum-difference operation so that in one case of direction finding the exciters located on one side of said partition can be compared with the exciters located on the other side of said partition, and in another case of direction finding oppositely located pairs of exciters can be compared with each other with respect to voltage.

9. An antenna arrangement according to claim 1, wherein said reflector comprises a rotation parabolic shape having an opening in its vertex, said exciters are horn radiators, and comprising turned back waveguides extending through the opening in the parabolic vertex feeding said horn radiators and combined in a compact group of low height.

* * * * *